Feb. 11, 1958  J. R. STANFIELD  2,822,859
ADJUSTABLE SEATS

Filed May 29, 1956  2 Sheets-Sheet 1

FIG. I.

Inventor
James R. Stanfield
By Scrivener + Parker
Attorneys

Feb. 11, 1958   J. R. STANFIELD   2,822,859
ADJUSTABLE SEATS
Filed May 29, 1956
2 Sheets-Sheet 2

Inventor
James R. Stanfield
By Scrivener & Parker,
Attorneys

United States Patent Office 2,822,859
Patented Feb. 11, 1958

2,822,859
ADJUSTABLE SEATS

James R. Stanfield, Castle Bromwich, Birmingham, England, assignor to The Austin Motor Company Limited, Northfield, Birmingham, England Application May 29, 1956, Serial No. 587,996

Claims priority, application Great Britain July 11, 1955

2 Claims. (Cl. 155—14)

This invention relates to adjustable seats, and more particularly to adjustable front seats of motor cars and like vehicles.

Motor car front seats which are bodily adjustable horizontally in a fore-and-aft direction into any position within a range of adjustment, or into any one of a number of predetermined positions in the range, are well known, and front seats with rigid underframes which have permanent or fixed pivotal connection with the floor, so that the whole seat (seat proper and underframe) can be tipped bodily forward to give access to the rear seat accommodation, are commonly used in smaller cars of the two-door saloon type, whilst car seats with articulated or adjustable triangulated underframes which have permanent or fixed pivotal connection with the floor are also well known, the arrangement being such that not only can the seat as a whole (seat proper and underframe) be tipped bodily forward about said fixed pivotal connection with the floor but the seat proper can be adjusted horizontally in the fore-and-aft direction into any of a number of predetermined positions by appropriate adjustment of the articulated or triangulated underframe, this latter adjustment being capable of being effected, at will, by the person occupying the seat.

The primary object of the present invention is to provide, for a motor car seat with a rigid or non-articulated underframe, a new or improved mounting which is of simple and cheap construction and which will provide for bodily forward tipping of the seat and also for fore-and-aft horizontal adjustment thereof. A further object is to provide for the ready removal of the seat, say for use externally of the car, when desired, or to facilitate cleaning of the interior of the car body.

According to the invention, the seat mounting is characterised in that it comprises a longitudinal series of locating bearings in any of which the lower front part of the rigid underframe of the seat can be pivotally engaged for forward tipping, and releasable retaining means for maintaining the said underframe in any of its positions of horizontal fore-and-aft adjustment as predetermined by said locating bearings. In any of its predetermined positions of pivotal mounting, the seat will be supported at the front by the locating bearings in which the lower front part of its rigid underframe is engaged and, except when the seat is tipped bodily forward, the lower rear part of the said underframe will rest upon the floor of the vehicle body or upon a fitting secured thereto. When the retaining means are released, the underframe of the seat is freed so that the seat can be moved to another of its predetermined positions as required or can be completely removed from its mounting.

The invention will now be described with reference to the embodiment shown in the accompanying drawings; in which.

Figure 1:
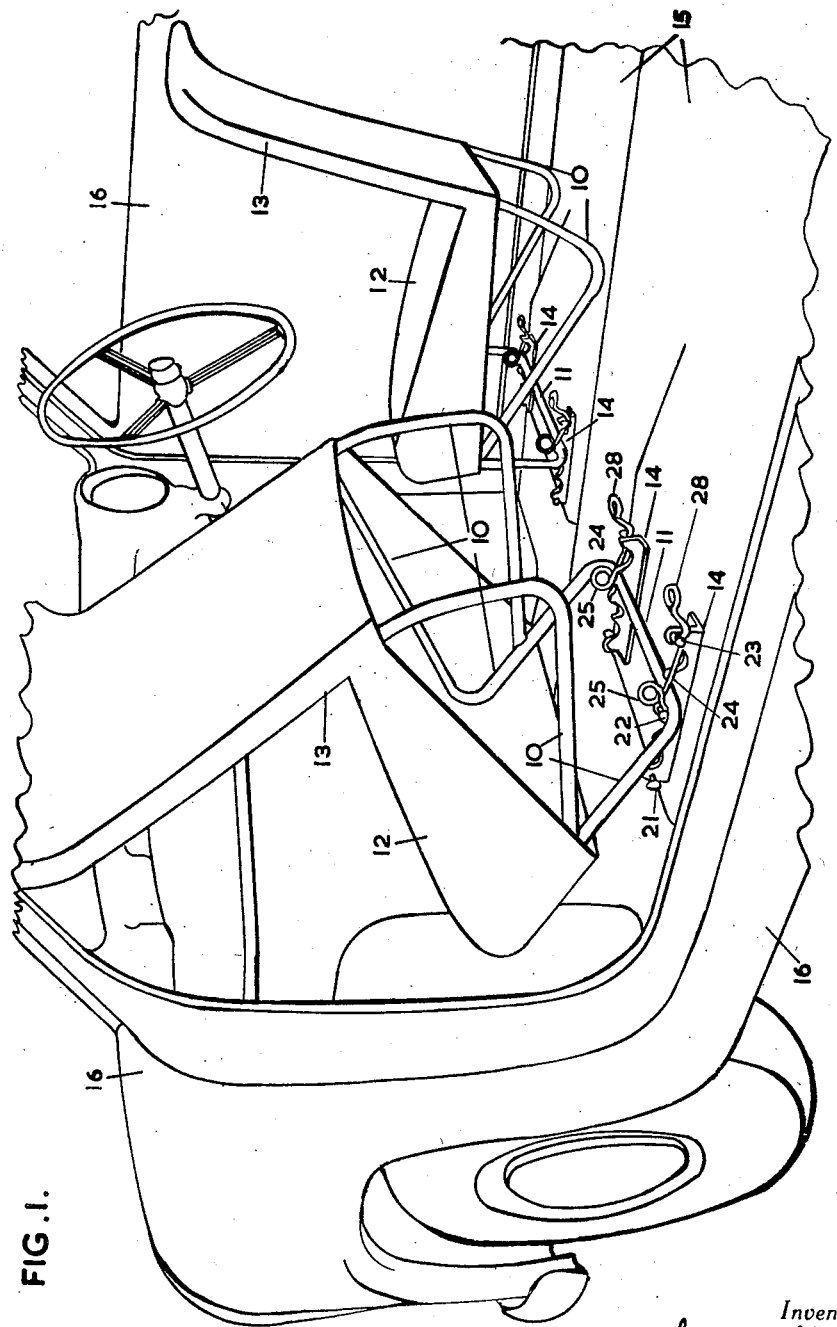
Fig. 1 is a fragmentary perspective view of a motor car and showing the driver's seat in its normal position and the passenger seat alongside in a forwardly tipped position to facilitate access to the rear seat accommodation.
Figure 2:
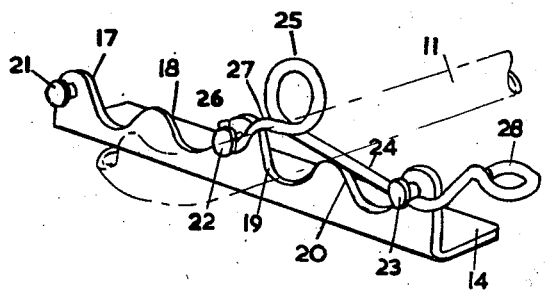
Figs. 2, 3, 4 and 5 are fragmentary perspective views to a larger scale and each illustrating the retention of the lower front part of one of the seats in a different location.
Figure 3:
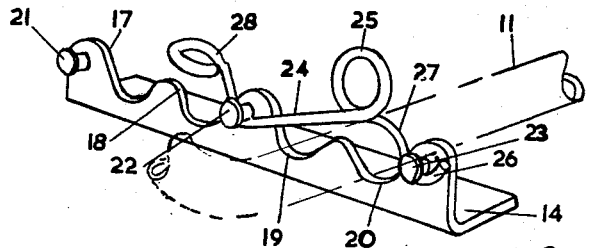
Figure 4:
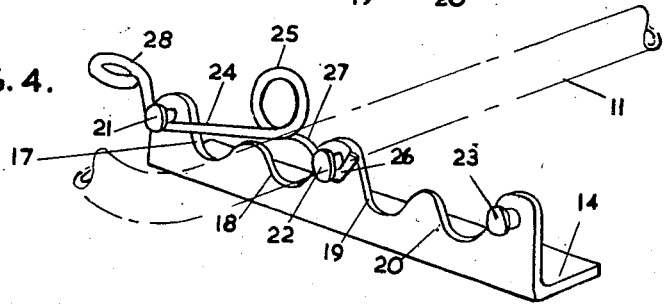
Figure 5:
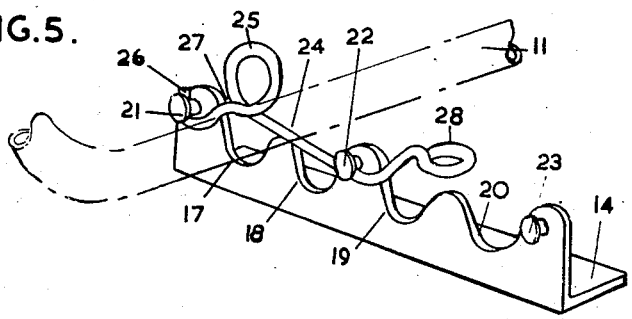

Referring to the drawings, and particularly to Fig. 1 each front seat has a non-articulated underframe 10 including a cross bar 11 which constitutes the lower front part of the whole seat (rigid underframe 10 with its cross bar 11, seat proper 12 and back rest 13). The mounting for each front seat comprises two laterally spaced brackets 14 which are fixed to the floor 15 of the vehicle body 16 and have corresponding longitudinal series of notches or open bearings 17, 18, 19, 20 (see Figs. 2–5 inclusive). Each of the fixed brackets 14 is of angle section with a horizontal flange thereof secured, say by welding, to the floor 15 and a vertical or upstanding flange formed with a sinuous upper edge the depressions in which constitute semi-circular notches or open bearings 17, 18, 19, 20. As shown, the two brackets 14 for each seat are fixed parallel to one another with corresponding locating notches or bearings transversely aligned to afford, in pairs, a longitudinal series of locations or predetermined positions in any of which the cross bar 11 of the rigid underframe 10 of the seat can be pivotally engaged and supported, as shown in Figs. 2 to 5 inclusive.

Projecting laterally from the upstanding flange of each bracket 14 are three headed studs 21, 22 and 23 which constitute abutments for spring clip means for maintaining the cross bar 11 of the rigid seat underframe 10 in engagement in any locating notch or bearing, said spring clip means comprising a rod-like member 24 of spring steel or wire formed with an approximately central spring coil 25, a hook 26 at one end, a portion 27 between the hook 26 and coil 25 for engaging the cross bar 11, and a loop or eye 28 at the other end which serves as a handle.

The studs 21 and 23 are fixed near the ends of the bracket 14 immediately alongside the end locations 17 and 20 respectively, and the stud 22 is fixed in the crest portion between the locations 18 and 19, whilst the rod-like member 24 is somewhat greater in length than the spacing of said studs. The arrangement is such that by engaging the hooked end 26 of the member 24 under the stud 21, 22 or 23 which is immediately adjacent the locating notch or bearing 17, 18, 19 or 20 in which the cross bar 11 is engaged, and pivoting said member 24 downwardly about siad stud, the portion 27 of the member 24 engages and bears down upon the cross bar 11, and by pressing down and flexing the still free end portion of said member it can be engaged below the next stud so as to maintain downward spring pressure upon said cross bar 11 and retain it in engagement with the locating notch or bearing.

In the construction shown in the drawings, the seat underframes 10 are of tubular construction of which the cross bar 11 constitutes the lower front part which is selectively and pivotally engaged with the alternative locating notches or bearings in the brackets 14. It will, however, be appreciated that, instead of a cross bar, axially and transversely disposed pins may be provided on the lower front part of the rigid seat frame, whether of tubular or other construction, for engaging said notches or bearings.

In any of the predetermined locations, either front seat can be bodily tipped forwardly to give access to the rear seating accommodation, and, upon releasing and removing the spring clip retaining means associated with either seat, it can be readily adjusted to any other of the predetermined locations, as may be desired, and the spring clip means engaged with the appropriate abutments or studs to retain the seat in its fresh position. Also either front seat can be readily released and removed from the body for use externally of the car or to facilitate cleaning the interior of said body.

Having fully described my invention what I claim and desire to secure by Letters Patent is:

1. A mounting providing for horizontal fore-and-aft adjustment of a vehicle seat comprising brackets of angle section with horizontal flanges whereby they are fixed to the floor of the vehicle body and with upstanding flanges formed in the upper edges with open bearings, said brackets being fixed in laterally spaced parallel relationship with corresponding bearings transversely aligned to afford, in pairs, a longitudinal series of predetermined positions for a cross bar constituting the lower front part of the rigid underframe of the seat, spring clip means associated one with each of said brackets and each comprising a rod-like member of springy material and a plurality of longitudinally spaced laterally projecting abutments on the upstanding flanges of said brackets, under two of which adjacent abutments the opposite ends of said rod-like member can be engaged with its intermediate portion bearing down with some pressure upon said cross bar to retain it in pivotal engagement with the bearings in which it is located.

2. A mounting providing for horizontal fore-and-aft adjustment of a vehicle seat, comprising brackets of angle section with horizontal flanges whereby they are fixed to the floor of the vehicle body and with upstanding flanges formed in the upper edges with open bearings, said brackets being fixed in laterally spaced parallel relationship with corresponding bearings transversely aligned to afford, in pairs, a longitudinal series of predetermined positions for a cross bar constituting the lower front part of the rigid underframe of the seat, spring clip means associated one with each of said brackets and each comprising a rod-like member of springy material and formed with a hook at one end, and abutments in the form of studs on the upstanding flanges of said brackets and adjacent the open bearings therein, the arrangement being such that the hooked end of each of said rod-like members can be engaged with that stud adjacent a bearing in which said cross member is located and each of said members can be pivoted downwardly about said stud to bear down upon said cross bar and that by pressing down and flexing the still free end of said rod-like member it can be engaged below another of said studs so as to maintain downward spring pressure upon the cross bar and retain it in said locating bearing.

References Cited in the file of this patent

UNITED STATES PATENTS

| | | |
|---|---|---|
| 1,747,329 | Smith | Feb. 18, 1930 |
| 1,751,907 | Cripps | Mar. 25, 1930 |
| 2,457,294 | Wood | Dec. 28, 1948 |
| 2,543,690 | Young, Jr. et al. | Dec. 19, 1950 |
| 2,650,948 | Findlay | Sept. 1, 1953 |
| 2,712,917 | Flora et al. | July 12, 1955 |

FOREIGN PATENTS

| | | |
|---|---|---|
| 212,063 | Great Britain | Mar. 6, 1924 |